United States Patent
Mulgund et al.

(10) Patent No.: US 6,816,862 B2
(45) Date of Patent: Nov. 9, 2004

(54) SYSTEM FOR AND METHOD OF RELATIONAL DATABASE MODELING OF AD HOC DISTRIBUTED SENSOR NETWORKS

(75) Inventors: Sandeep S. Mulgund, Arlington, MA (US); Sanjeev Mohindra, Andover, MA (US); Robert Fricke, Belmont, MA (US)

(73) Assignee: Tiax LLC, Cambridge, MA (US)

( * ) Notice: Subject to any disclaimer, the term of this patent is extended or adjusted under 35 U.S.C. 154(b) by 316 days.

(21) Appl. No.: 10/051,844

(22) Filed: Jan. 17, 2002

(65) Prior Publication Data

US 2002/0161751 A1 Oct. 31, 2002

Related U.S. Application Data

(60) Provisional application No. 60/262,226, filed on Jan. 17, 2001.

(51) Int. Cl.[7] .............................................. G06F 17/30
(52) U.S. Cl. ......................................... 707/10; 709/224
(58) Field of Search ........................... 707/10; 709/223, 709/224

(56) References Cited

U.S. PATENT DOCUMENTS

| | | | |
|---|---|---|---|
| 5,185,860 A | * | 2/1993 | Wu ............................. 709/224 |
| 5,586,305 A | | 12/1996 | Eidson et al. ................ 395/500 |
| 5,650,800 A | | 7/1997 | Benson ........................ 345/173 |
| 5,761,206 A | | 6/1998 | Kackman ..................... 370/476 |
| 5,946,083 A | | 8/1999 | Melendez et al. ............. 356/73 |
| 5,987,011 A | | 11/1999 | Toh ............................. 370/331 |
| 6,013,108 A | | 1/2000 | Karolys et al. .............. 792/189 |
| 6,035,240 A | | 3/2000 | Moorehead et al. ............ 700/2 |
| 6,124,806 A | | 9/2000 | Cunningham et al. . 340/870.02 |
| 6,131,119 A | * | 10/2000 | Fukui .......................... 709/224 |
| 6,191,847 B1 | | 2/2001 | Melendez et al. ............. 356/73 |
| 6,208,247 B1 | | 3/2001 | Agre et al. .................. 340/539 |
| 6,336,900 B1 | | 1/2002 | Alleckson et al. .......... 600/485 |
| 6,526,442 B1 | * | 2/2003 | Stupek et al. ............... 709/224 |

* cited by examiner

Primary Examiner—Jack Choules
(74) Attorney, Agent, or Firm—Choate, Hall & Stewart (57) ABSTRACT

Method of and system for aggregating into a relational database model the state of an ad hoc network comprised of uniquely addressable distributed sensor nodes in communication using networking protocols with one another through links and to a database server through access points. A relational database logical design resident on the database server is dynamically updated with respect to the sensor network's current and historical topological information through the use of a traversal and interrogating network modeling agent. The distributed sensors nodes may be mobile, and may communicate by wired or wireless means through networking protocols such as the Internet.

9 Claims, 9 Drawing Sheets

SYSTEM FOR AND METHOD OF RELATIONAL DATABASE MODELING OF AD HOC DISTRIBUTED SENSOR NETWORKS

This application claims priority to U.S. Provisional Application Ser. No. 60/262,226, filed Jan. 17, 2001, which is incorporated herein by reference in its entirety.

FIELD OF THE INVENTION

The present invention relates generally to distributed sensor network state discovery and maintenance. More specifically, the invention employs a quasi-recursive traversing and interrogating algorithm from a remote location to sensor nodes in a network in order to construct and maintain a relational database model of the sensor network on a database server.

BACKGROUND OF THE INVENTION

There has been an exponential growth of Internet infrastructure related to electronic data transfer. The expansion was due, in large measure, to what was perceived as a new business model related to the dot.com explosion. The rapid growth of the dot.com world squeezed 30 years of physical plant installation into a five or ten year period. Some say that with the recent implosion of the dot.com world, billions of dollars have been wasted. The Applicants contend that, in fact, this valuable infrastructure, both physical and procedural, offers an enormous opportunity. The new Internet infrastructure can be leveraged and real value can be harvested in support of industry, the consumer sector, users of medical devices, and more. It is precisely this opportunity that is the driving motivation behind the present invention.

Technology development in a number of disparate areas is enabling new interdisciplinary approaches to solve long-standing problems. Three technologies of particular interest are the miniaturization of sensors and actuators, wireless coupling of these devices to enterprise information systems, and software for dynamic, real-time access to remote systems over the Internet. What is needed is a means for converging these technologies, in order to enable the transformation of disconnected sensors generating reams of data into highly connected networks of sensors generating added value information. This convergence will permit organizations to connect all electronic sensing and actuation into a single, integrated information architecture.

The tools needed to implement the vision of seamless, global access to remote information are available only in part, and not yet as an integrated package. The Applicants describe below the development of an information architecture, which is referred to in certain embodiments as Intelemetric™, and a method of using the architecture which make it possible to aggregate, store, process, and distributed, real-time distributed sensor data into the enterprise, and make resulting information readily available over the Internet.

SUMMARY OF THE INVENTION

In one aspect, the present invention is an information architecture that permits the Internet to contact distributed sensors at one point, databases and mining engines at another point, and users at another point. In this aspect, the invention is an enabling interface between the Internet and the physical world. Due to the global reach of the Internet, these physical points of contact may be distributed anywhere in the world. The Applicants have invented a sensor network modeling agent for use with a relational database and a logical design resident therein.

In another aspect, the present invention is a method of database modeling that makes it possible to create, store, and update a virtual model of a network of sensors within a relational database structure. The network modeling agent dynamically updates various sensor node data and link data that collectively define an instantaneous "state" of the sensor network into the database logical design. The network modeling agent thereby facilitates access, visualization, and the use of a stream of information generated by the network of distributed sensors. The sensor nodes to be interrogated by the network modeling agent are assumed to be uniquely addressable and in communication, using networking protocols, with one another through links and with a database server through one or more access points. A method according to the present invention comprises the steps of discovering and maintaining the distributed sensor network topology by applying at every access point a uqasi-recursive algorithm, which causes the network modeling agent to visit a first sensor node and mark the first node visited, push the marked first node onto a stack, and while the stack is non-empty, query the node at the top of the stack for a list of current links to the node at the top, compare the list of current links to a list of historical links to the node at the top of the stack and update the historical link and historical node information, and if there are no unmarked nodes reachable from a current link then pop the stack, otherwise visit the next reachable unmarked node, mark the next node and push it onto the stack. The network modeling agent builds the database model by updating relational database logical design tables at each step of the discovering step. The agent maintains the database model by periodically reapplying the interrogating algorithm, thereby updating the database model to account for sensor node and link additions and deletions. The periodicity of updates is preferably such that a near real-time topology of the sensor network is maintained.

In another embodiment, the present invention is a method as described above, wherein the logical design tables further comprise a data table for mapping between one or more sensor nodes and the tables used to store the associated sensor output data associated with the one or more sensor nodes.

In certain embodiments, the present invention is used in modeling networks comprised of mobile sensor nodes. The sensor nodes may communicate by wired or wireless means. The database server used with the present invention may be remotely located from the distributed sensor network.

DETAILED DESCRIPTION OF CERTAIN EMBODIMENTS

Preferred embodiments of the invention will now be described with reference to the accompanying drawings.

Figure 1:
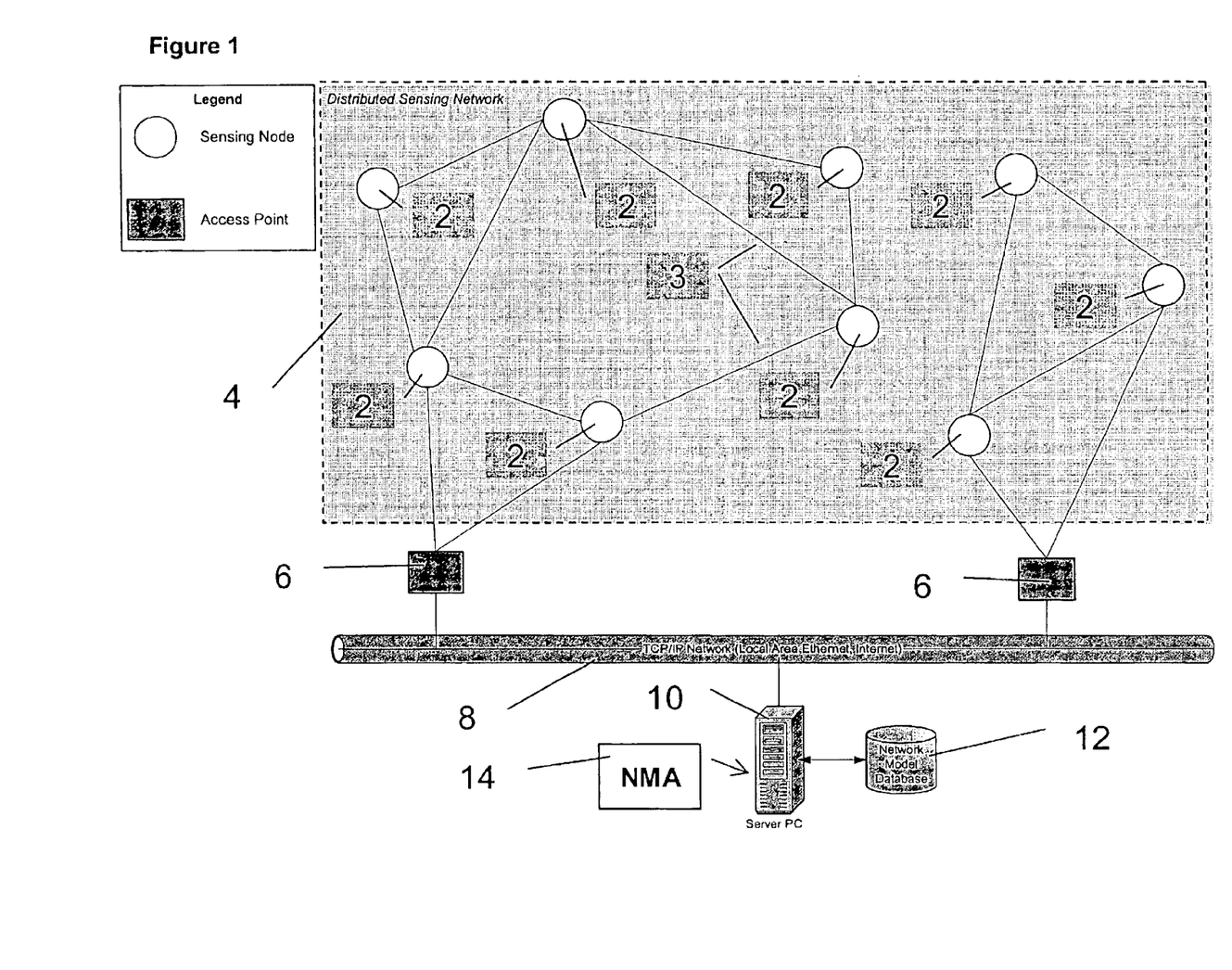
FIG. 1 is an illustration of a distributed sensor network in communication through one or more access points to a IT infrastructure operating a network modeling agent according to the present invention.
Figure 2:
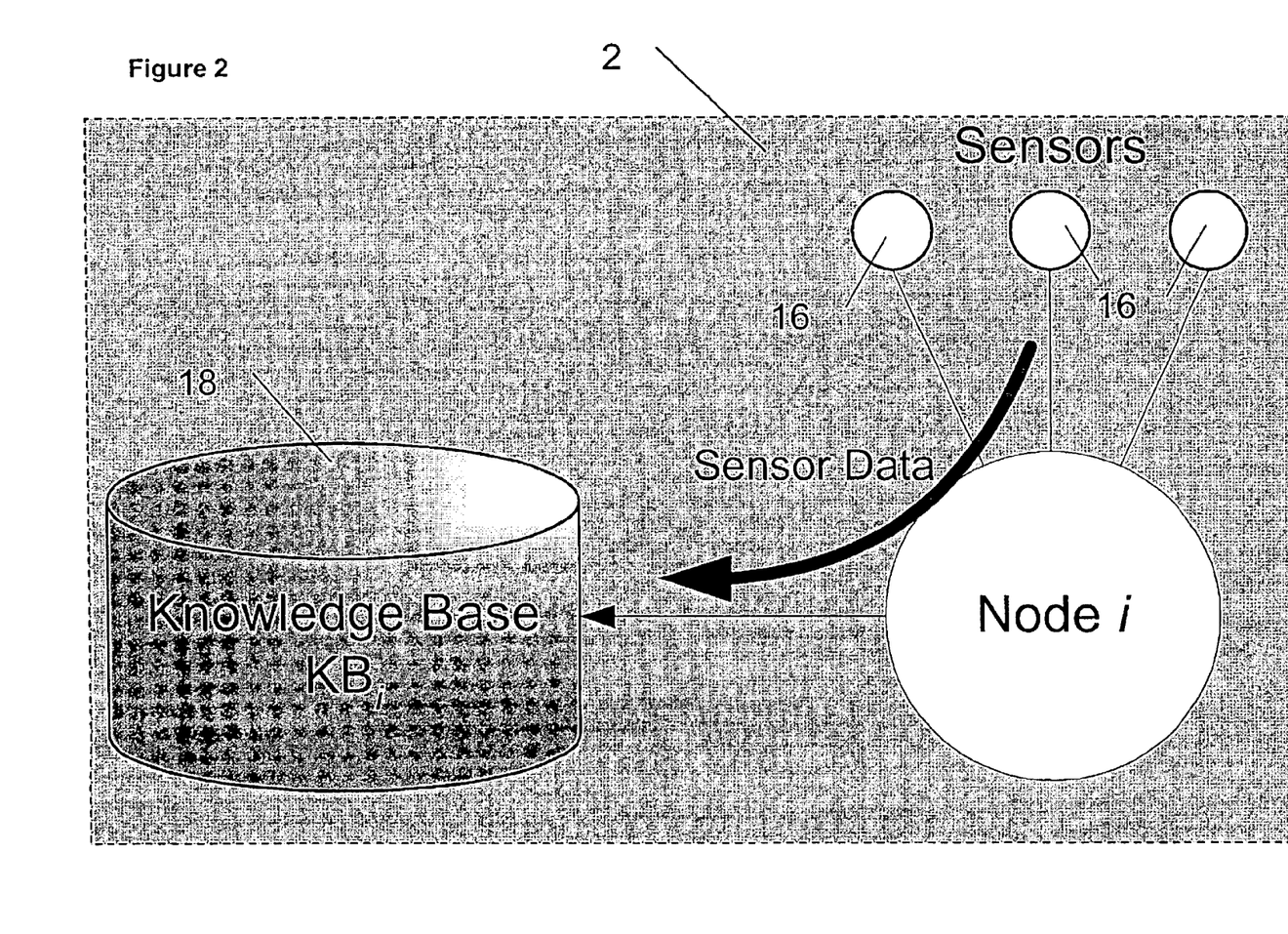
FIG. 2 is an illustration of the elements of a simple node.

FIG. 1 illustrates the environment in which the present invention may be employed. Distributed sensing nodes 2 are connected to one another in a sensing network 4 through some kind of ad hoc networking protocol, with an attendant physical implementation (which may be wired or wireless). The topology of the network 4 is largely unconstrained, except that there exist a finite number of known access points 6 that comprise a bridge between the sensing network 4 and a conventional information technology (IT) infrastructure such as a corporate LAN 8. The access points 6 provide the means by which the information at each node 2 can be obtained from outside the network 4. The access points 6 may even be implicit; the sensing network 4 could just as easily be a peer-to-peer arrangement on a conventional TCP/IP network. On the LAN 8 is a database server 10 includes a network model database 12 and operates a network modeling agent (NMA) 14. The NMA 14 is useful in creating a model of the instantaneous state of the sensing network 4. The model created is comprised of the following data elements:

- an identity (unique identifying information such as a numeric address) of each of the sensing nodes 2 in the network 4, as well as any metadata about each node;
- a connectivity of each of the sensing nodes 2; i.e., a structural representation of the network topology that could be used to reconstruct a diagram such as FIG. 1;
- an up-to-date information content at each of the sensing nodes 2; i.e., a real-time snapshot and time-history of the data of interest generated at each node location by an attached suite of sensors 16, as depicted in FIG. 2; and
- a history of the network 4 from the moment the model was first constructed, which would allow a reconstruction of the network's state at any time in the past.

It is of no concern how this network topology came into being, how it is organized, what routing algorithms are used to pass messages from one node to the next, but rather, how to aggregate the information at each of the nodes into an off-network repository or network model database 12. The sensing nodes 2 may be mobile, and the interconnections may change over time. Furthermore, new nodes may join the network 4 at any time, and existing nodes may leave the network unexpectedly.

FIG. 2 illustrates the nature of each of the sensing nodes 2, which comprise computational devices (possibly ranging in complexity from small embedded platforms to a fully-fledged PCs) that have one or more sensors 16 providing high-value information connected to it. The term sensor is used here in a general sense. A sensor 16 as contemplated herein could be as simple as an instrument that measures temperature, pressure, or any such other physical quantity. It could also be a device as complex as a video camera providing continuous full-motion imagery of some area of interest. In any case, the output of each of these sensors 16 is stored locally in a well-defined knowledge base 18, but the output can be accessed from outside the network 4 through some software application programming interface (API) and hardware implementation. Each of the sensing nodes 2 is additionally in communication with one or more other sensing nodes through connecting links 3.

The following assumptions about each of the sensing nodes 2 are made:

- each node is addressable from the outside world or from other nodes;
- the structure and nature of the sensor(s) output data is known a priori or it can be retrieved by interrogating the node with which the sensor(s) are associated;
- each node contains some local memory or other knowledge base 18 for recording sensor output data, which can be retrieved by interrogating the node;
- each node uses networking protocols that allow it to communicate with its neighboring nodes in the ad hoc sensor network (again, it is of no import how the sensor network came into being, how its connectivity is specified, or how nodes find one another); and
- each node is essentially a read-only device (no assumptions are made regarding the capability of each node to inform any agent running on the database server 10 to update its associated information.)

With these constraints, we now describe the operation of the NMA 14 in modeling the state of the network 4 within a conventional relational database 12. There are two key components to this problem: the relational database structure used to encapsulate a complete, unambiguous description of the network 4; and the means by which the network model is built. Section 1 below describes a simplified database structure, while Section 2 presents and describes the application of a quasi-recursive algorithm for building the model.

Section 1: Database Representation

Figure 3:
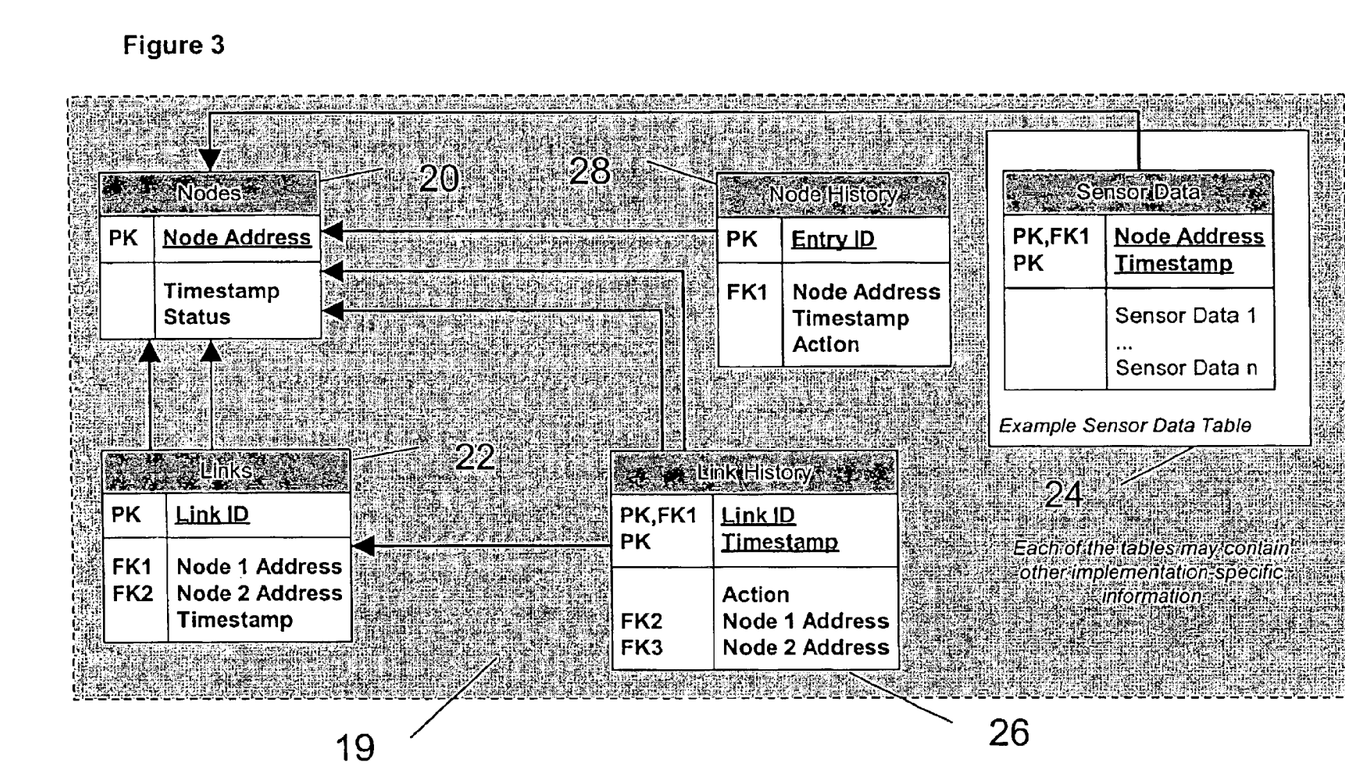
FIG. 3 is a block diagram of a database model logic design in accordance with the present invention.

FIG. 3 presents a candidate relational database logical design 19 for capturing information about the sensor network 4, comprising: a node address for each of the sensing nodes 2 in the network, as shown in a Node Table 20; each sensing node's connectivity to other sensing nodes, as shown in a Links Table 22; the information content each node presents, as shown in one or more Node Data Table(s) 24; and a history of the network's state, as reflected in a Node History Table 28 and a Link History Table 26.

Note that a skilled artisan will recognize that any practical implementation of the logical design 19 would have many more problem-specific elements. FIG. 3 is not intended to be limiting in any manner, but merely illustrative of the minimum requirements of a relational database logical design 19 in accordance with the present invention, specifically an embodiment in which each sensing node is collecting numeric data from n sensors.

The Nodes Table 20 maintains a list of all known sensor nodes 2 in the network 4. Each node is identified by a unique Node Address, which is a primary key for the Nodes Table 20. The Nodes Table also contains a Status field, which is used to indicate whether a node is known to be active. This field is used for marking nodes that have disappeared from the network (which could later reappear). At present, it is anticipated that this Status variable will take on one of just a small set of mutually exclusive values that indicate whether or not the associated node continues to be an active, reachable member of the network 4. Finally, the Nodes Table 20 contains a Timestamp field that indicates when the Status information was last updated. When a node disappears from the network for whatever reason, the corresponding entry in the Nodes Table 20 is not deleted; it is marked as unreachable. The reason for doing so is explained below.

By itself, the Nodes Table 20 is insufficient for characterizing the network's structure. Also required is a mechanism for specifying inter-node connectivity, which is provided by the Links Table 22. The primary key for the Links Table 22 is a unique Link ID number for each link 3, said number can be generated automatically by modern relational DB software. The Link Table 22 also contains Node Addresses identifying the nodes at each end of each link 3, and a Timestamp that specifies when information about a link's existence was last updated. Certain constraints exist on the Links Table 22, which are enforced externally through the use of stored procedures. Specifically, there can be only one entry in the Links Table 22 for a connection between any two nodes A and B. There cannot simultaneously be an entry {ID, A, B, Timestamp} and an entry {ID, B, A, Timestamp}. To enforce this constraint, we define a stored procedure to ensure link uniqueness when an attempt is made to enter a link definition into the Link Table 22.

Together, the Nodes Table 20 and Links Table 22 define the instantaneous topology of the sensor network 4. It is also desirable to be able to reconstruct the network structure at any point in the past. The Node History Table 28 and Link History Table 26 provide this capability. When an entry is made or updated in the Nodes table, a stored procedure is executed to generate an entry in the Node History Table 28 automatically. This latter entry duplicates the information placed in the Nodes Table 20, along with an Action field that captures whether new node information was inserted, or the Status of an existing node was updated. Similarly, when a new link is inserted into the Links Table 22 or an existing link is deleted, a stored procedure inserts a record of that event in the Link History Table 26. Finally, when an existing node is marked as unreachable, stored procedures automatically delete any links to/from that node in the Links Table 22, and corresponding entries are made in the Link History Table 26. Together, these two history tables make it possible to reconstruct the past state of the sensor network at any desired point in time.

The relational database logical design 19 is further comprised of one or more Node Data Tables 24 used to capture the actual information content from each node; i.e., the sensor data output. This is highly problem-specific, because the Sensor Data could range in complexity from periodic ambient temperature measurements to full-motion MPEG video that streams from each node. Furthermore, each node could be generating a different type of information, which would necessitate the definition and instantiation of several different Sensor Data Tables 24, perhaps even more than one per node (depending on the complexity of the information stream).

FIG. 3 illustrates the simplest case, wherein each node 2 generates n well-defined sensor data signals. The composite primary key for the Sensor Data Table 24 is the identity of the Node Address and a Timestamp, followed by n individual sensor data outputs. This ensures that the only allowable entries are for known nodes, and that only one entry can be made per node at a given time instant. In this simple case, all Sensor Data is stored in the same Sensor Data Table 24. Each node may have a unique internal sampling rate, and the node itself may be sampled by the database server 10 at different rates; no assumptions are made about these operations. The relationship between this Sensor Data Table 24 and Nodes Table 20 illustrates why entries on individual nodes are not deleted from the Nodes table when they become unreachable: access to historical sensor data from past members of the network is preferred, even if those members are no longer present.

Figure 4:
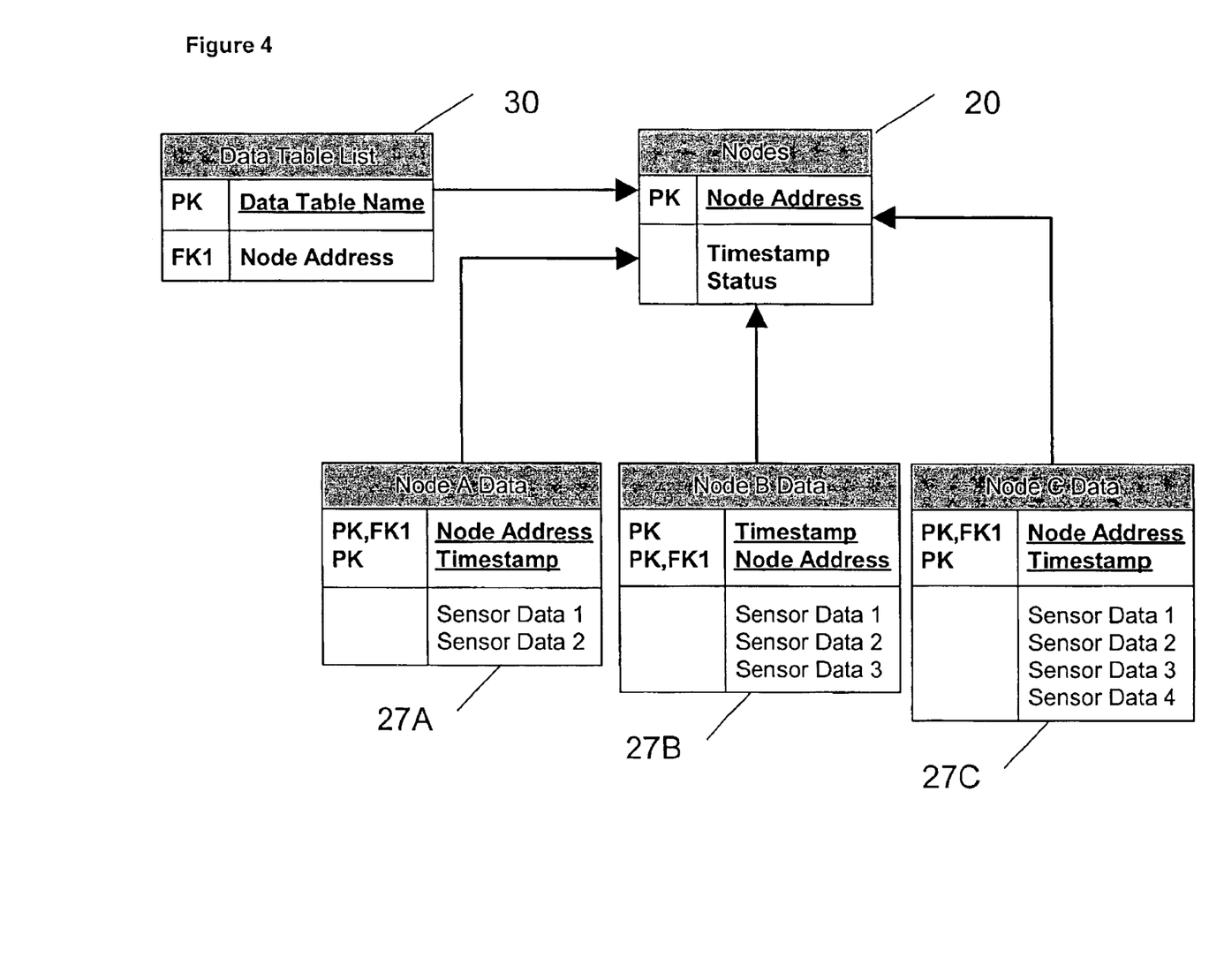
FIG. 4 is an illustration of a portion of an alternative database model logic design embodiment of the present invention, including a Data Table List table.

In another embodiment, the database logical design 19 further comprises a Data Table List 30 that provides a mapping between individual nodes 2 and the names of the tables used to store those nodes' Sensor Data. Each of these tables is defined and created dynamically, based on the structure of the information at each node. FIG. 4 illustrates an embodiment of a network model logical design 19 for a three-node network configuration wherein each of the three nodes (A, B, C) provides a different amount of data. As such a network is traversed and the Nodes Table 20 is populated, an entry is made in the Data Table List Table 30 that identifies the name of the table associated with a given node. In the example illustrated, each node (A, B, C) has its own Node Data Table (27A–C). Each of Node Data Table is defined to accommodate the type of sensor data known to originate from that node. As discussed earlier, it is assumed that the software agent on the database server can interrogate the node to determine what type of information it provides, and then define the table structures accordingly.

Section 2: Network Traversal Algorithm

To build the database representation of the sensor network 4 described above, the NMA 14 employs a means to traverse the network in order to interrogate each node. The NMA 14 employs a quasi-recursive algorithm that is run on the database server 10 to build and maintain the database network model. The NMA 14 is a software agent resident on the database server 10 and written in any compatible computer language, whose responsibility is to build and update this model. As discussed earlier, it is assumed that there exists some software API that allows the NMA 14 to access each node on the network, which is reached via one or more access points 6 that can be reached via Internet protocols from the database server 10.

To support creation and maintenance of the database model, the NMA 14 performs database updates in response to the following events:

Initial model construction: When the database server 10 first establishes a connection with the sensor network 4, it must discover and build a model of that network's topology.

Node addition: it is assumed that sensing nodes 2 can join the ad hoc sensor network 4 at any time. Sensing nodes are added to the network when they form links 3 (i.e., bi-directional communication channels) with other nodes that are already part of the sensor network.

Node deletion: Once the network 4 is established, its topology is not necessarily static. In the case of mobile nodes that communicate with one another wirelessly, a node may go out of range of all of its neighboring nodes and thus cease to be part of the network. Even in the case of fixed nodes, a node may be shut off and thus cease to be part of the network.

Link Addition: New direct links may form between individual nodes even if the number and identity of the nodes in the network is fixed. The Link Table 22 shown earlier must be updated accordingly to reflect the evolving topology.

Link deletion: Links between any two nodes may cease to exist if the two nodes are unable to communicate with one another due, for example, to range limitations in a wireless network.

The next section describes a quasi-recursive depth first search algorithm that can be used to support the functions needed for handling all of these events. It then illustrates the application of the search algorithm to each of the events described above.

2.1 Algorithm Psuedo-Code

As described previously, it is assumed that there exist a finite number of known access points 6 to the sensor network 4. The search algorithm presented below is applied sequentially by the NMA 14 over all access points to build the network model.

Let x be the specified access point 6 (also a node) where the traversal of the network 4 is to begin. Let N be the Node Table 20, NH be the Node History Table 28, L be the Link Table 22, and LH be the Link History Table 26 as described in the previous section. Let CAL be the list of links 3 discovered by querying the nodes 2, and HAL be the list of links discovered in the previous traversal. Let S be the stack for keeping track of the traversal, and NUM(v) be the traversal order (i.e., sequence) of the node v.

The NMA 14 building the network model invokes the Traversal function on each of the access points 6. This function uses the Visit and Mark functions shown subsequently in the course of its operations.

```
Begin Sweep
Traversal (x: node)
    S ← Empty
    v ← x
    i ← 0
    Set all nodes in N as unmarked
    Visit (v)
        Mark (v, i)
        push v into S
        while S is non-empty do
            t ← the node at the top of the stack S
            CAL ← List of current links to t obtained by querying
node t
            HAL ← List of historical links to t obtained by
querying existing database
            Compare CAL and HAL. If different update L, LH, N, NH
tables
            if there is no unmarked node w reachable from a link
in CAL then
                pop (S)
            else
                for each unmarked node w reachable from a link in CAL
            do
                    i ← i + 1
                    Visit (w)
                    Mark (w, i)
                    Push w into S
                end for
            else if
        end while
    end Traversal
    for each unmarked node w in N do
        Update NH table to indicate that node is unreachable
    end for
End Sweep
    Visit (w: node)
        Retrieve information in KB_w from node w
        Update N
    end Visit
    Mark (v: node, i: id)
    Timestamp(v) ← current time
        NUM(v) ← i
end Mark
```

The operation of the NMA 14 in constructing and maintaining the network model, using the algorithm, will now be described.

2.2 Algorithm Walk-Through

In the following five subsections we illustrate the application of the network traversal algorithm to each of the event types described above. These "walk-throughs" describe how database tables are built and updated in response to events within the network.

2.2.1 Initial Construction of Network Model

Figure 5:
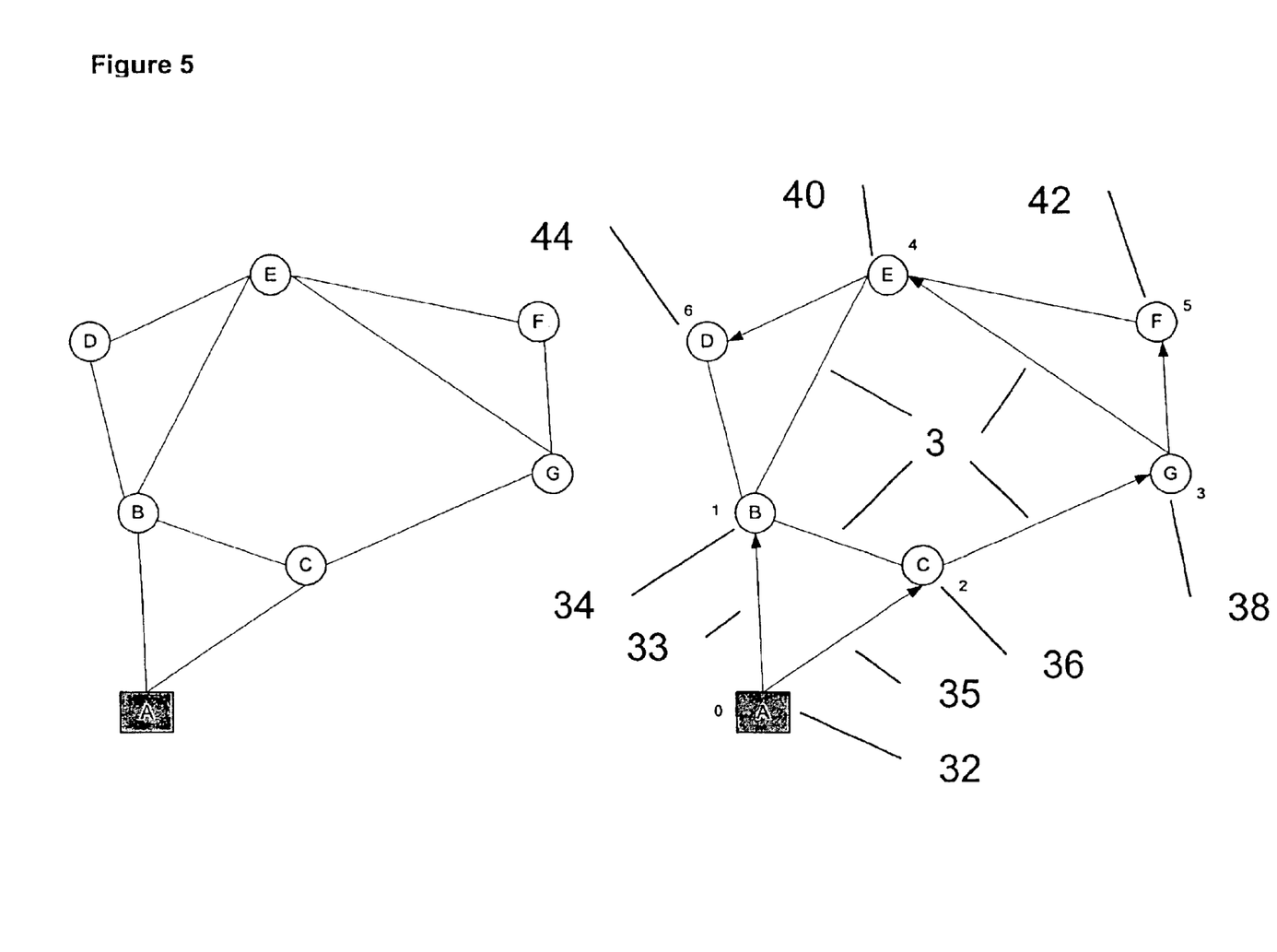
FIG. 5 is an illustration of a sensor network whose topology is discoverable by a network modeling agent.

Table 1 presents a walkthrough of the algorithm presented above, for building an initial model of the network illustrated in FIG. 5. The left portion of FIG. 5 illustrates the topology of a network connected to a single access point 6, while the right side shows the order of traversal. Observe that not all links 3 are traversed (though all are examined). This ensures that each node is visited just once during the model construction process.

Table 1 provides details of the process by which the network 4 is traversed. The first column of Table 1 shows the node stack maintained by the NMA 14. The second column (CAL) shows the current links from the Node at the top of the stack. The third column (HAL) shows the links that were obtained from the node at the top of the node stack in a previous sweep of the entire network. The fourth column shows the actions performed inside the for-loop of the pseudo-code.

TABLE 1

Network Traversal Process for Initial Model Construction

| Stack S | CAL | HAL | Action | Visit order |
|---|---|---|---|---|
| — | — | — | Visit A, Push A | A = 0 |
| A | {AB} {AC} | {AB} {AC} | Visit B, Push B | B = 1 |
|  |  |  | Visit C Push C | C = 2 |
| C<br>B<br>A | {CB} {CA} {CG} | {CB} {CA} {CG} | Visit G, Push G | G = 3 |
| G<br>C<br>B<br>A | {GC} {GE} {GF} | {GC} {GE} {GF} | Visit E, Push E<br>Visit F, Push F | E = 4<br>F = 5 |
| F<br>E<br>G<br>C<br>B | {FE} {FG} | {FE} {FG} | Pop F |  |

TABLE 1-continued

Network Traversal Process for Initial Model Construction

| Stack S | CAL | HAL | Action | Visit order |
|---|---|---|---|---|
| A<br>E<br>G<br>C<br>B<br>A | {EF} {EG} {EB} {ED} | {EF} {EG} {EB} {ED} | Visit D, Push D | D = 6 |
| D<br>E<br>G<br>C<br>B<br>A | {DE} {DB} | {DE} {DB} | Pop D | |
| E<br>G<br>C<br>B<br>A | {EF} {EG} {EB} {ED} | {EF} {EG} {EB} {ED} | Pop E | |
| G<br>C<br>B<br>A | {GC} {GE} {GF} | {GC} {GE} {GF} | Pop G | |
| C<br>B<br>A | {CB} {CA} {CG} | {CB} {CA} {CG} | Pop C | |
| B<br>A | {{BD} {BE} {BC} | {BD} {BE} {BC} | Pop B | |
| A | {AB} {AC} | {AB} {AC} | Pop A | |
| — | — | — | Check for unreachable nodes. Finish. | |

The traversal process begins at node A 32. Node A 32 is visited and pushed onto the stack. The process of visiting a node involves retrieving the information stored at the node, and updating the local database.

Next, the NMA 14 examines the node at the top of the stack. If the stack is empty, the NMA 14 has completed traversal. If the stack is non-empty, the NMA 14 looks at the node at the top of the stack, and then queries the node for all its link information. On obtaining this information, the NMA 14 compares it to the link information obtained from the node in the previous sweep of the network. No difference between the CAL and HAL for node A 32 is seen. The NMA 14 then examines each link 3 of the currently visited node and the node at the other end of the link. If the NMA 14 has not seen (marked) the node on the other end of the link before, it visits the node on the other end of the link and pushes it on the stack. The NMA 14 then marks the node as visited by assigning a visit order number to it, and by assigning a Timestamp representing the time it was visited. In our example, CAL consists of links {AB} 33, {AC} 35. Nodes B 34 and C 36 are unmarked. The NMA 14 visits node B 34 and pushes it on the stack. The NMA then visits node C 36 and pushes it on the stack. By following a similar procedure, the NMA visits and marks nodes G 38, E 40, and F 42. When node F 42 is at the top of the stack, there is no node reachable from node F that has not been marked. Therefore, the NMA Pops Node F from the stack. When node E 40 reaches the top of the stack, the NMA discovers another node D 44 which has not been marked. The NMA visits it, and pushes it on the stack. At this point, node D 44 does not have links to any unvisited node. The NMA therefore pops D from the stack. Following the algorithm, the NMA continues to pop nodes E, G, C, B, and A until an empty stack remains. At this point, the NMA checks the Node Table 20 to see if any node that was visited in a previous traversal of the network has become unreachable during this traversal. In this case there are no unreachable nodes. That completes a sweep of the network. The next sweep can now be scheduled.

2.2.2 Adding a New Node

Figure 6:
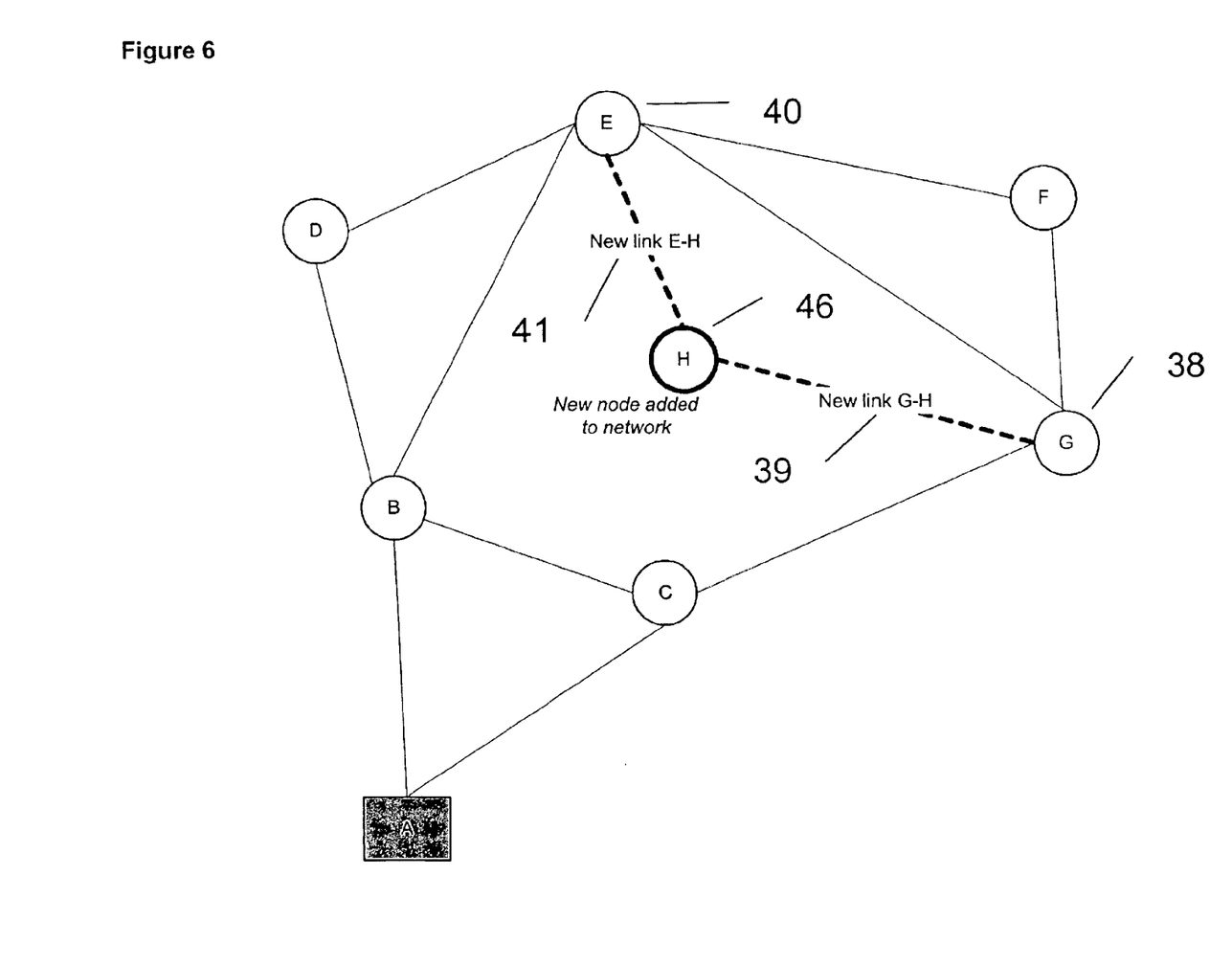
FIG. 6 is an illustration of the network modeling agent's discovery of a new sensor node in a sensor network.

Once an initial model of the sensor network has been constructed, new nodes may join the network at any time. The introduction of a new node is detected only when it forms links with its neighboring node(s), as shown in FIG. 6. In the example presented, node H 46 forms links (39, 41) with nodes G 39 and E 40. The network's topology is otherwise unchanged.

Assuming that nodes E 40, G 38, and H 46 are unaware of the interest that the database server 10 has in their information outputs, the NMA 14 is responsible for discovering any new network member(s). This implies that the NMA must perform periodic network traversals to ensure that the database model is in sync with the true state of the network.

The addition of node H 46 changes the traversal sequence through the network. The NMA performs periodic traversals to detect such changes. The traversal proceeds as described above until node G 38 is at the top of the stack. At this time, a new link {GH} 39 is discovered. Table 2 illustrates the new network traversal process. The differences from the traversal sequence of Table 1 are marked in bold. The discovery of a new link and node results in new entries into the Link Table 22 and Node Table 20. Note that a check for the existence of the node and link is performed prior to making any additions. Node H 46 is then visited and pushed onto the stack. Note also that the discovery of the new node changes the visit order for the various nodes.

TABLE 2

Network Traversal Process for Node Addition

| Stack S | CAL | HAL | Action | Visit order |
|---|---|---|---|---|
| — | — | — | Visit A, Push A | A = 0 |
| A | {AB} {AC} | {AB} {AC} | Visit B, Push B | B = 1 |
|  |  |  | Visit C Push C | C = 2 |
| C<br>B<br>A | {CB} {CA} {CG} | {CB} {CA} {CG} | Visit G, Push G | G = 3 |
| G<br>C<br>B<br>A | {GH} {GC} {GE} {GF} | {GC} {GE} {GF} | Add {GH} to link table<br>Add H to Node Table<br>Visit H, Push H<br>Visit E, Push E<br>Visit F, Push F | H = 4<br>E = 5<br>F = 6 |
| F<br>E<br>H<br>G<br>C<br>B<br>A | {FE} {FG} | {FE} {FG} | Pop F |  |
| E<br>H<br>G<br>C<br>B<br>A | {EF} {EG} {EB} {ED}<br>{EH} | {EF} {EG} {EB} {ED} | Visit D, Push D<br>Add {EH} to link table | D = 7 |
| D<br>E<br>H<br>G<br>C<br>B<br>A | {DE} {DB} | {DE} {DB} | Pop D |  |
| E<br>H<br>G<br>C<br>B<br>A | {EF} {EG} {EB}<br>{ED} {EH} | {EF} {EG} {EB} {ED} | Pop E |  |
| H<br>G<br>C<br>B<br>A | {HE} {HG} |  | Pop H |  |
| G<br>C<br>B<br>A | {GC} {GE} {GF} | {GC} {GE} {GF} | Pop G |  |
| C<br>B<br>A | {CB} {CA} {CG} | {CB} {CA} {CG} | Pop C |  |
| B<br>A | {{BD} {BE} {BC} | {BD} {BE} {BC} | Pop B |  |
| A | {AB} {AC} | {AB} {AC} | Pop A |  |
| — | — | — | Check for unreachable nodes. Finish. |  |

2.2.3 Deleting a Node

Figure 7:
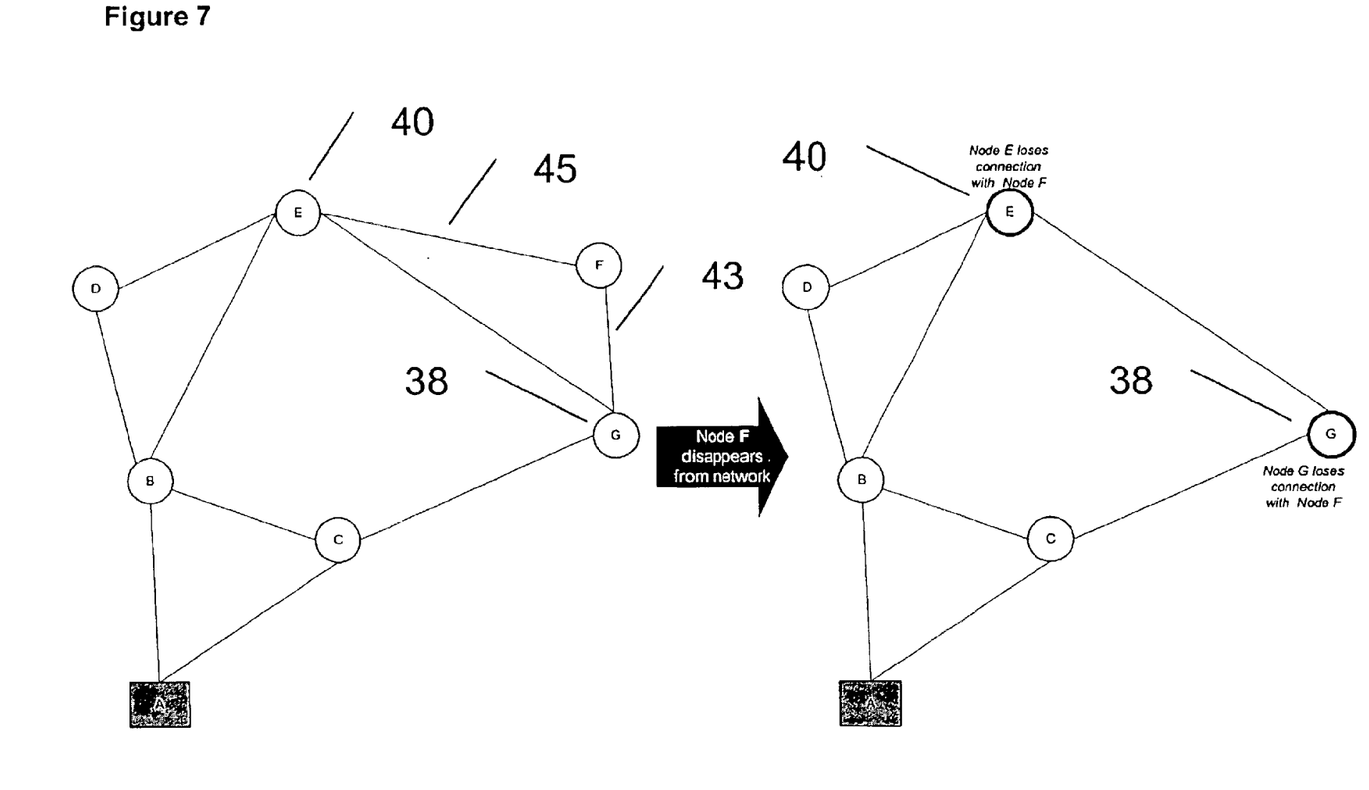
FIG. 7 is an illustration of the network modeling agent's discovery of a missing or deleted sensor node in a sensor network.

The network's topology changes when a node disappears from the network, as shown in FIG. 7. If individual nodes are mobile, a node can disappear if it is out of range of all of its neighboring nodes, ceasing to be connected. A node also could be removed from the network if it suffers a system failure of some kind, or it is even possible that it may be programmed only to operate for a finite amount of time each day. Regardless of the cause, it becomes necessary to ensure that the database does not describe nodes that are no longer part of the network.

The loss or deletion of a node from the sensing network is similarly discovered during a periodic traversal for ensuring model integrity. Table 3 presents the traversal process for a case of node deletion. The traversal proceeds as previously describe until node G 38 is at the top of the stack. At this time, link {GF}43 is discovered to be missing. This triggers the action of deleting link {GF} from the Link Table 22. Note that a check for the existence of the link is performed prior to any deletions are made. In a similar manner, link {EF} 45 is deleted from the Link Table 22. At the end of the traversal, a check is made for any nodes that were unmarked.

The node history table is updated to show that node F 42 is unreachable.

TABLE 3

Network Traversal Process for Node Deletion

| Stack S | CAL | HAL | Action | Visit order |
|---|---|---|---|---|
| — | — | — | Visit A, Push A | A = 0 |
| A | {AB} {AC} | {AB} {AC} | Visit B, Push B | B = 1 |
|  |  |  | Visit C Push C | C = 2 |
| C<br>B<br>A | {CB} {CA} {CG} | {CB} {CA} {CG} | Visit G, Push G | G = 3 |
| G<br>C<br>B<br>A | {GC} {GE} | {GC} {GE} {GF} | Delete link {GF}<br>Visit E, Push E | E = 4 |
| E<br>G<br>C<br>B<br>A | {EG} {EB} {ED} | {EF} {EG} {EB} {ED} | Delete link {E F}<br>Visit D, Push D | D = 6 |
| D<br>E<br>G<br>C<br>B<br>A | {DE} {DB} | {DE} {DB} | Pop D |  |
| E<br>G<br>C<br>B<br>A | {EG} {EB} {ED} | {EF} {EG} {EB} {ED} | Pop E |  |
| G<br>C<br>B<br>A | {GC} {GE} | {GC} {GE} {GF} | Pop G |  |
| C<br>B<br>A | {CB} {CA} {CG} | {CB} {CA} {CG} | Pop C |  |
| B<br>A | {{BD} {BE} {BC} | {BD} {BE} {BC} | Pop B |  |
| A | {AB} {AC} | {AB} {AC} | Pop A |  |
| — | — | — | Check for unreachable nodes.<br>Update node history table to show that F is unreachable.<br>Finish. |  |

2.3.4 Adding a New Link Between Existing Nodes

Figure 8:
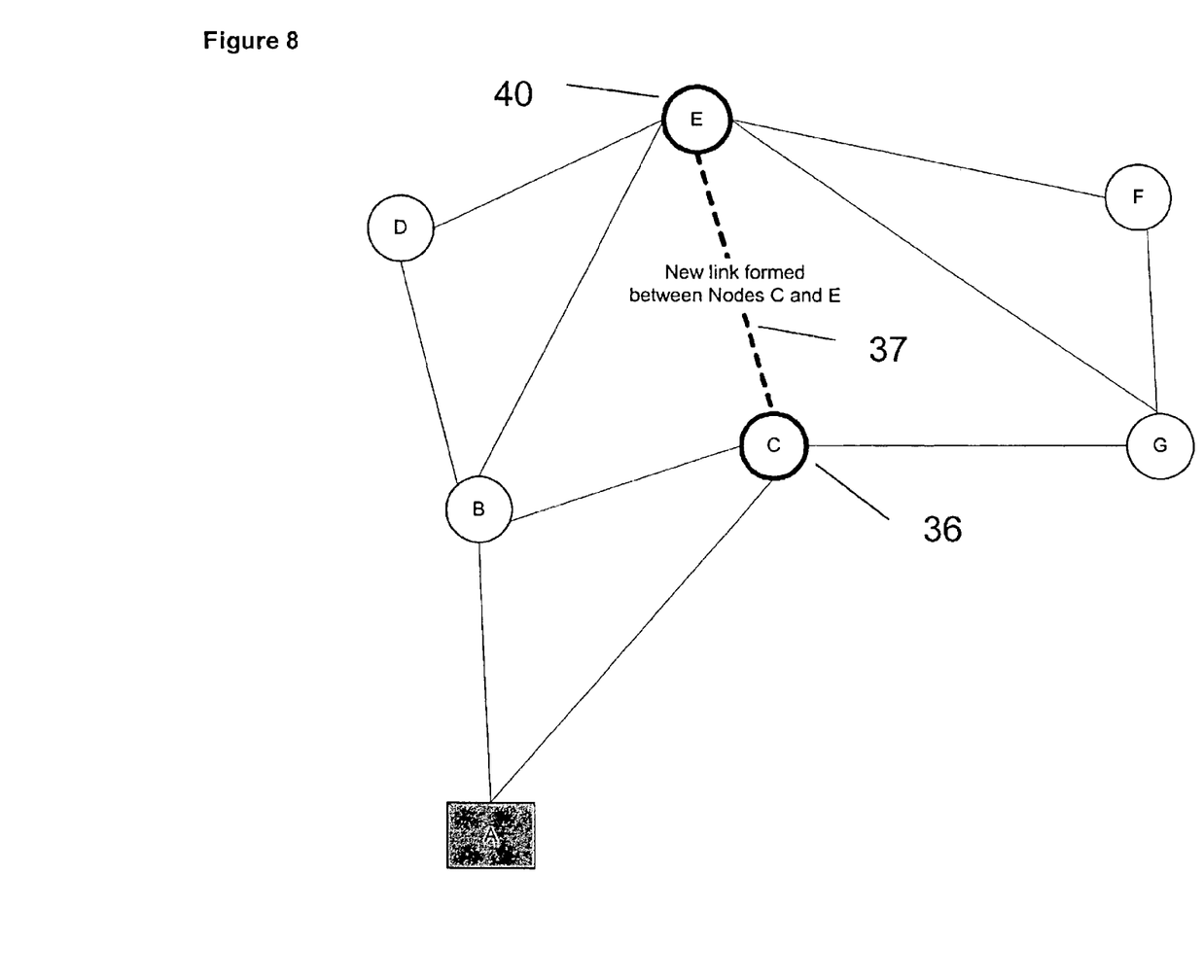
FIG. 8 is an illustration of the network modeling agent's discovery of a new link between existing sensor nodes in a sensor network.

The topology of the sensor network 4 can change even if the number of nodes remains fixed. For example, FIG. 8 illustrates a situation in which a new link {CE} 37 is formed between nodes C 36 and E 40. This could happen in a network of mobile nodes if two of the nodes come sufficiently close to one another that they establish direct mutual communications. In the example shown, node C now has a link with node E, and vice versa. This new information must be captured in the database.

Table 4 illustrates the traversal process, with changes from the initial model construction traversal sequence marked in bold. The traversal proceeds as before until node C 36 reaches the top of the stack. At this point, link {CE} 37 is discovered and added to the Link Table 22. Observe that this also changes the order of traversal of the nodes.

TABLE 4

Network Traversal Process for Link Addition

| Stack S | CAL | HAL | Action | Visit order |
|---|---|---|---|---|
| — | — | — | Visit A, Push A | A = 0 |
| A | {AB} {AC} | {AB} {AC} | Visit B, Push B | B = 1 |
|  |  |  | Visit C Push C | C = 2 |
| C<br>B | {CB} {CA} {CE} {CG} | {CB} {CA} {CG} | Add link {CE}<br>Visit E, Push E | E = 3 |
| A |  |  | Visit G, Push G | G = 4 |
| G<br>E<br>C<br>B | {GC} {GE} {GF} | {GC} {GE} {GF} | Visit F, Push F | F = 5 |

TABLE 4-continued

Network Traversal Process for Link Addition

| Stack S | CAL | HAL | Action | Visit order |
|---|---|---|---|---|
| A F G E C B A | {FE} {FG} | {FE} {FG} | Pop F | |
| G E C B A | {GC} {GE} {GF} | {GC} {GE} {GF} | Pop G | |
| E C B A | {EF} {EG} {EB} {ED} {EC} | {EF} {EG} {EB} {ED} | Visit D, Push D | D = 6 |
| D E C B A | {DE} {DB} | {DE} {DB} | Pop D | |
| E C B A | {EF} {EG} {EB} {ED} {EC} | {EF} {EG} {EB} {ED} | Pop E | |
| C B A | {CB} {CA} {CG} | {CB} {CA} {CG} | Pop C | |
| B A | {{BD} {BE} {BC} | {BD} {BE} {BC} | Pop B | |
| A | {AB} {AC} | {AB} {AC} | Pop A | |
| — | — | — | Check for unreachable nodes. Finish. | |

2.2.5 Deleting a Link Between Existing Nodes

Figure 9:
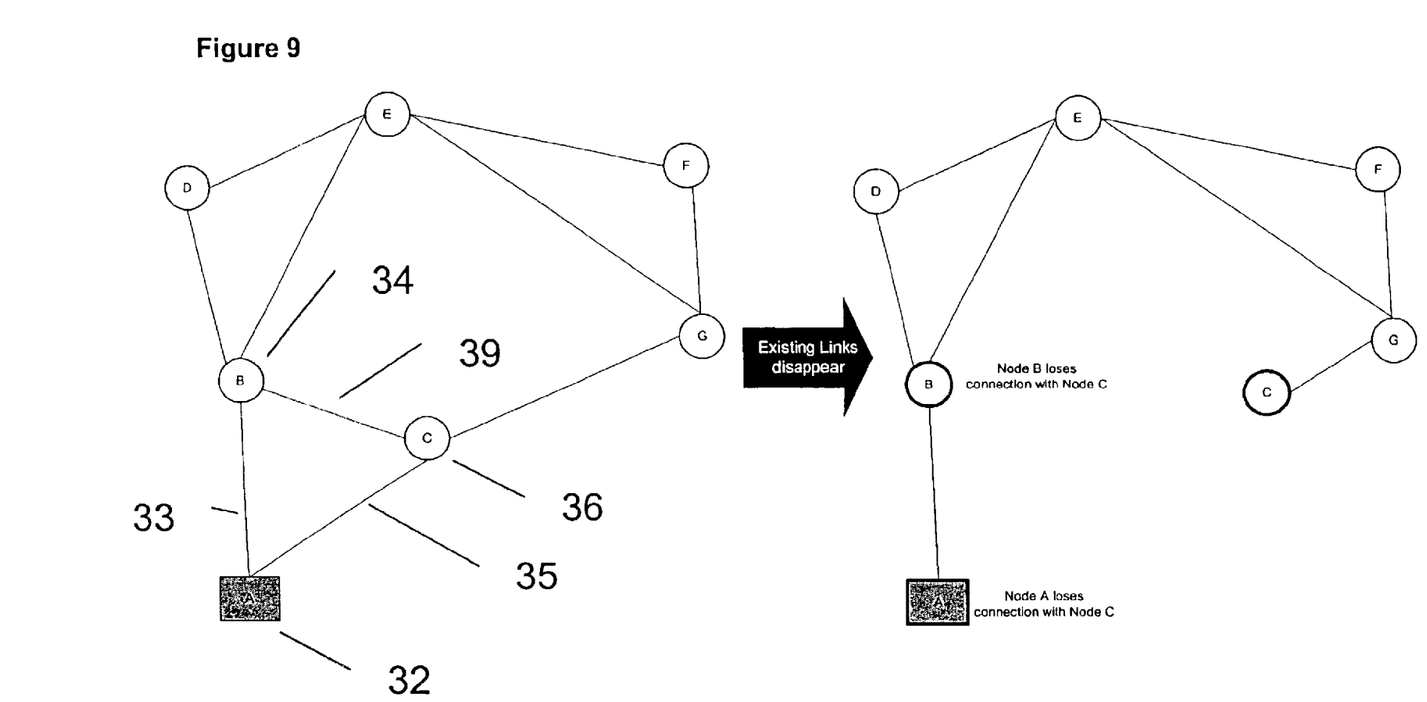
FIG. 9 is an illustration of the network modeling agent's discovery of a missing link between existing sensor nodes in a sensor network.

The network's topology can change if links between nodes cease to operate, as shown in FIG. 9. In the example given, nodes A 32 and B 34 both lose their direct connection to node C 36.

As before, the traversal algorithm described above is used to ensure that the database model reflects this change in sensor network configuration. In this case, the link deletions completely change the order of the traversal, as shown below in Table 5. When node A 32 is at the top of the stack, link {AC} 35 is discovered to be deleted. When node B 34 is at the top of the stack, the NMA 14 discovers that link {BC} 39 needs to be deleted from the links database.

TABLE 5

Network Traversal Process for Link Deletion

| Stack S | CAL | HAL | Action | Visit order |
|---|---|---|---|---|
| — | — | — | Visit A, Push A | A = 0 |
| A | {AB} | {AB} {AC} | Delete link {AC} Visit B, Push B | B = 1 |
| B A | {BA} {BD} {BE} | {BC} {BA} {BD} {BE} | Delete link {BC} Visit D, Push D Visit E, Push E | D = 2 E = 3 |
| E D B A | {EF} {EG} {EB} {ED} | {EF} {EG} {EB} {ED} | Visit F, Push F Visit G, Push G | F = 4 G = 5 |
| G F E D B A | {GC} {GE} {GF} | {GC} {GE} {GF} | Visit C, Push C | C = 6 |
| C G F E D B | {CA} {CG} | {CB} {CA} {CG} | Pop C | |

TABLE 5-continued

Network Traversal Process for Link Deletion

| Stack S | CAL | HAL | Action | Visit order |
|---|---|---|---|---|
| A | | | | |
| G | {GC} {GE} {GF} | {GC} {GE} {GF} | Pop G | |
| F | | | | |
| E | | | | |
| D | | | | |
| B | | | | |
| A | | | | |
| F | {FE} {FG} | {FE} {FG} | Pop F | |
| E | | | | |
| D | | | | |
| B | | | | |
| A | | | | |
| E | {EF} {EG} {EB} {ED} | {EF} {EG} {EB} {ED} | Pop E | |
| D | | | | |
| B | | | | |
| A | | | | |
| D | {DE} {DB} | {DE} {DB} | Pop D | |
| B | | | | |
| A | | | | |
| B | {BD} {BE} | {BD} {BE} {BC} | Pop B | |
| A | | | | |
| A | {AB} | {AB} {AC} | Pop A | |
| — | — | — | Check for unreachable nodes. Finish. | |

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of aggregating into a relational database model the state of an ad hoc network comprised of uniquely addressable distributed sensor nodes in communication using networking protocols with one another through links and to a database server through access points, comprising the steps of:

provising a relational database logical design resident on the database server in communication with the distributed sensor network, wherein the logical design is comprised of one or more tables specifying sensor node identities and node activity indicators, timestamping information, link identification, linked nodes information, historical link information, historical node information, and acquired sensor output data;

discovering the distributed sensor network topology by applying at every access point an interrogating algorithm further comprising the steps of
visiting a first node,
marking the first node visited,
pushing the marked first node onto a stack, and
while the stack is non-empty,
  querying the node at the top of the stack for a list of current links to the node at the top,
  comparing the list of current links to a list of historical links to the node at the top of the stack and updating the historical link and historical node information, and if there are no unmarked nodes reachable from a current link then pop the stack, otherwise visiting the next reachable unmarked node,
  marking the next node and pushing it onto the stack;

building a database model of the distributed sensor network by updating the relational database logical design tables at each step of the discovering step;

maintaining the database model by periodically reapplying the interrogating algorithm, thereby updating the database model to account for sensor node and link additions and deletions.

2. The method of claim 1, wherein the distributed sensor nodes comprise mobile nodes.

3. The method of claim 1, wherein the database server is in communication with the distributed sensor network through wired means.

4. The method of claim 1, wherein the database server is in communication with the distributed sensor network through wireless means.

5. The method of claim 1, wherein the database server is in communication with the distributed sensor network via the Internet.

6. The method of claim 1, wherein the database server is located remotely from the distributed sensor network.

7. The method of claim 1, wherein the periodicity of reapplying the interrogating algorithm approximates real-time updating of the distributed sensor network state.

8. The method of claim 1, wherein the logical design further comprises data table information for mapping between one or more sensor nodes and the tables used to store the associated sensor output data associated with the one or more sensor nodes.

9. A network modeling agent for aggregating into a relational database model the state of an ad hoc network comprised of uniquely addressable distributed sensor nodes in communication using networking protocols with one another through links and to a database server through access points, the network modeling agent comprising:

a relational database logical design resident on the database server in communication with the distributed sensor network, wherein the logical design is comprised of one or more tables specifying sensor node identities and node activity indicators, timestamping information, link identification, linked nodes information, historical link information, historical node information, and acquired sensor output data;

computer code executable on the database server for executing at every access point the steps of:

discovering the distributed sensor network topology by visiting a first node,
marking the first node visited,
pushing the marked first node onto a stack, and
while the stack is non-empty,
   querying the node at the top of the stack for a list of current links to the node at the top,
   comparing the list of current links to a list of historical links to the node at the top of the stack and updating the historical link and historical node information,
   and if there are no unmarked nodes reachable from a current link then pop the stack,
   otherwise visiting the next reachable unmarked node, marking the next node and pushing it onto the stack;
building a database model of the distributed sensor network by updating the relational database logical design tables at each step of the discovering step; and
maintaining the database model by periodically rediscovering the distributed sensor network topology, thereby updating the database model to account for sensor node and link additions and deletions.

\* \* \* \* \*